(12) United States Patent
Bergerson et al.

(10) Patent No.: US 7,363,631 B1
(45) Date of Patent: Apr. 22, 2008

(54) INTERFACE FOR ACCESSING AN OPEN DISTRIBUTED TRANSACTION PROCESSING SYSTEM LOG FILE

(75) Inventors: Robert L. Bergerson, Blaine, MN (US); Scot S. Hall, St. Paul, MN (US); Jacqueline M. Schrab, Shoreview, MN (US); Susan A. Senger, New Brighton, MN (US)

(73) Assignee: Unisys Corporation, Blue Bell, PA (US)

( * ) Notice: Subject to any disclaimer, the term of this patent is extended or adjusted under 35 U.S.C. 154(b) by 839 days.

(21) Appl. No.: 10/745,005

(22) Filed: Dec. 23, 2003

(51) Int. Cl.
G06F 13/14 (2006.01)
G06F 13/36 (2006.01)
G06F 9/46 (2006.01)

(52) U.S. Cl. .................... 719/318; 719/313
(58) Field of Classification Search .............. 719/313, 719/318
See application file for complete search history.

(56) References Cited

U.S. PATENT DOCUMENTS

| | | | | |
|---|---|---|---|---|
| 5,612,898 | A * | 3/1997 | Huckins | 709/224 |
| 5,826,021 | A * | 10/1998 | Mastors et al. | 709/203 |
| 6,018,746 | A * | 1/2000 | Hill et al. | 707/202 |
| 6,021,408 | A * | 2/2000 | Ledain et al. | 707/8 |
| 6,021,436 | A * | 2/2000 | Garrett | 709/224 |
| 6,052,695 | A * | 4/2000 | Abe et al. | 707/202 |
| 6,347,330 | B1 * | 2/2002 | Dawson et al. | 709/203 |
| 6,446,086 | B1 * | 9/2002 | Bartlett et al. | 707/200 |
| 6,728,879 | B1 * | 4/2004 | Atkinson | 713/168 |
| 7,007,197 | B2 * | 2/2006 | Miller et al. | 714/15 |
| 2002/0124215 | A1 * | 9/2002 | Austen et al. | 714/57 |
| 2002/0147739 | A1 * | 10/2002 | Clements et al. | 707/500 |
| 2005/0228834 | A1 * | 10/2005 | Shinkai | 707/202 |

* cited by examiner

*Primary Examiner*—William Thomson
*Assistant Examiner*—Richard Pantoliano, Jr.
(74) *Attorney, Agent, or Firm*—Charles A. Johnson; Robert Marley; Crawford Maunu PLLC

(57) ABSTRACT

Method and apparatus for providing access to an event log file. An open distributed transaction processing system writes information to a current logical portion of the event log file in processing transactions. A first service is callable by a client to instruct the open distributed transaction processing system to cycle the event log file. In other embodiments, additional services are accessible to the client for manipulating the event log file.

11 Claims, 4 Drawing Sheets

INTERFACE FOR ACCESSING AN OPEN DISTRIBUTED TRANSACTION PROCESSING SYSTEM LOG FILE

FIELD OF THE INVENTION

The present disclosure relates to distributed transaction processing systems.

BACKGROUND OF THE INVENTION

The distributed transaction processing paradigm generally supports processing of a "global" transaction which may have one or more supporting transactions that collectively perform the functions required by the global transaction. Each of the supporting transactions may be performed on physically separate and remote server systems. Some distributed transaction processing systems are implemented to provide an open, standards-compliant environment for developing applications. The "open" type of distributed transaction processing makes it possible to develop, deploy, and administer mission-critical distributed transaction processing applications across different types of machines and different types of networks. An example implementation may adhere to the Open Group Distributed Transaction Processing (DTP) model. Using standards-compliant interfaces, client programs and service routines may be developed to collaborate in processing of transactions across networks. Typically, client programs are application programs that interact with users, and service routines are application program modules that provide services, such as reading and updating databases. Transaction processing systems that adhere to these types of standards are referred to herein as open distribution transaction processing systems, or "open DTP systems" for short.

Once a base set of service routines are established in an open DTP environment, a variety of client applications that call on the services may be developed according to users' requirements. These client applications may be developed and deployed on systems that are remote from the system that hosts the service routines. If implemented according to standards-compliant interfaces, the client applications and service routines may be hosted by different types of hardware and operating systems.

Various tools have been developed for assisting in troubleshooting a transaction processing application program. For example, some systems log to an event log file information that describes transaction-related events. The information in the event log file may be used to diagnose and resolve problems in application programs. However, the tools used in manipulating the event log file may be proprietary to the underlying transaction processing system and to the system that hosts the transaction processing system. This may make developing and troubleshooting client applications in a distributed transaction processing environment difficult.

SUMMARY OF THE INVENTION

The various embodiments of the invention provide access to an event log file generated by an open distributed transaction processing system. The open distributed transaction processing system writes information to a current logical portion of the event log file in processing transactions. A first service is callable by a client to instruct the open distributed transaction processing system to cycle the event log file. In other embodiments, additional services are accessible to the client for manipulating the event log file.

The above summary of the present invention is not intended to describe each disclosed embodiment of the present invention. The figures and detailed description that follow provide additional example embodiments and aspects of the present invention.

BRIEF DESCRIPTION OF THE DRAWINGS

Other aspects and advantages of the invention will become apparent upon review of the Detailed Description and upon reference to the drawings in which.

DETAILED DESCRIPTION

Figure 1:
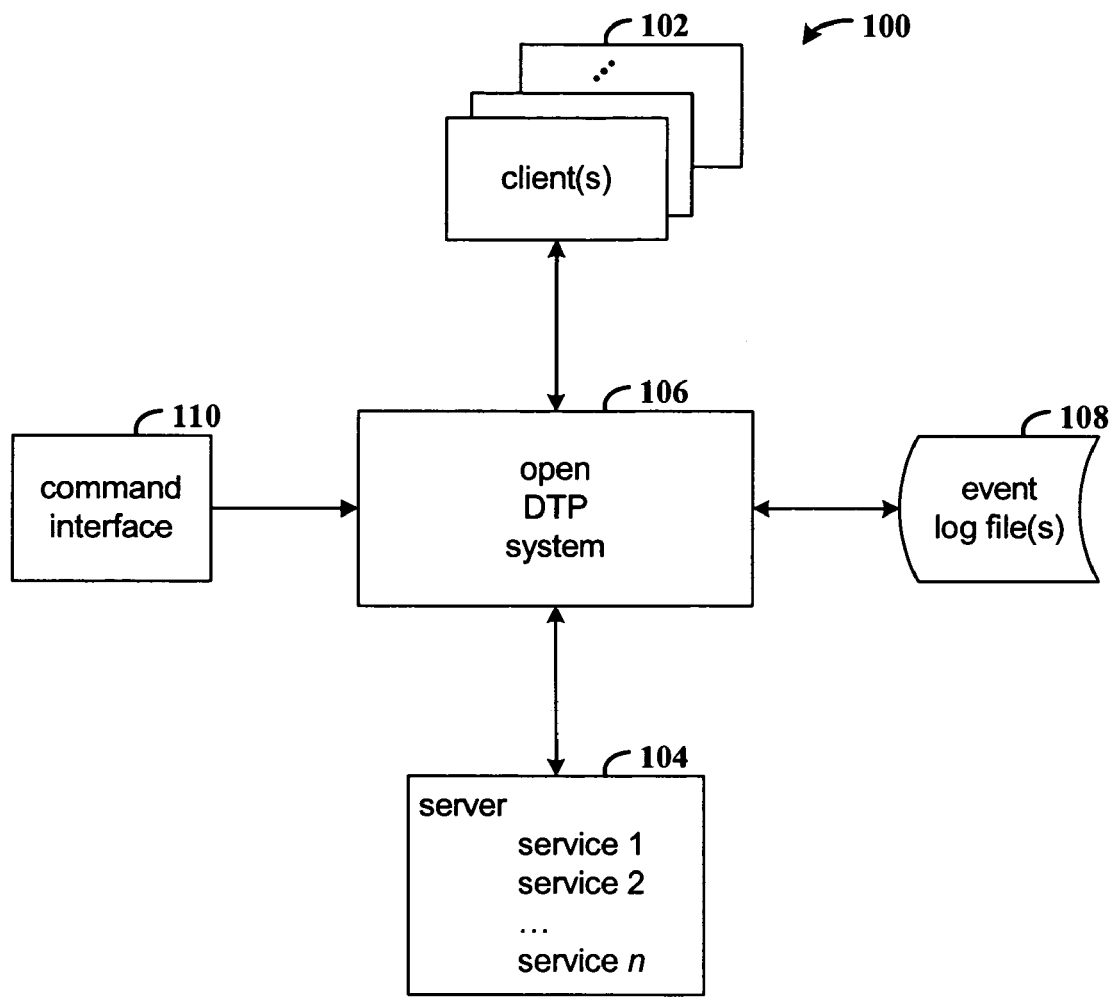
FIG. 1 is a functional block diagram that illustrates an example of a client-server computing arrangement in which transaction-related information is logged during the course of processing transactions.

FIG. 1 is a functional block diagram that illustrates an example of a client-server computing arrangement in which transaction-related information is logged during the course of processing transactions. The client/server model 100 is one specific form of application-to-application communications dialogue defined by The Open Group. The relationship between two application programs (APs) is defined by their roles in this dialogue. The calling APs include clients 102, and the called AP is the server 104.

Clients typically handle the front-end work of traditional applications, for example, handling the dialogue with a user. The clients accept input data from users and return the results of transactions in the form of data or messages. Although clients can perform some of their own back-end work as well, the task of communicating with database management systems and other resource managers (RM) is typically left to service routines. The client may be a program running on a user's workstation. Alternatively, the client program may be hosted by the system that hosts the server 104.

A server 104 is a collection of one or more related services as defined by the application. Examples of rules governing this dialogue are defined in The Open Group XATMI specification. A server responds to service requests from clients by passing the service name and associated input data to the appropriate service routine. Service routines interact with databases or other resource managers (not shown) to perform specific tasks on behalf of clients. The service routines call library routines, for example, Tx or XATMI routines, of the underlying resource manager. Service routines may also issue service requests to other service routines to include them in global transactions or to begin their own global transactions.

Service routines typically handle the back-end work of traditional online transaction processing applications and have no user interface functions. As with clients, service routines do not need to know about the network.

In the course of processing transactions, the open DTP system 106 logs information related to the transactions to one or more event log files 108. The open DTP system 106 automatically creates and logs information to a system-level event log file, and additional event log files may be created in response to configuration data and cycled at the direction of the clients 102. The information may indicate different degrees of seriousness of different events or indicate some course of action to be taken by an administrator or user. For example, some events may be a "REMARK" type, which may be of little consequence, while "ERROR," "WARNING," and "ALARM" types may require immediate action by an administrator.

The open DTP system may provide various entry points to functions that support manipulating and viewing information in the event log file. These functions may be accessed by a command-based interface 110, for example. The command interface may require not only the user to know the particular syntax of and sequence of commands for viewing the log file, but also that the user have terminal-type access to the system hosting the open DTP system 106.

Figure 2:
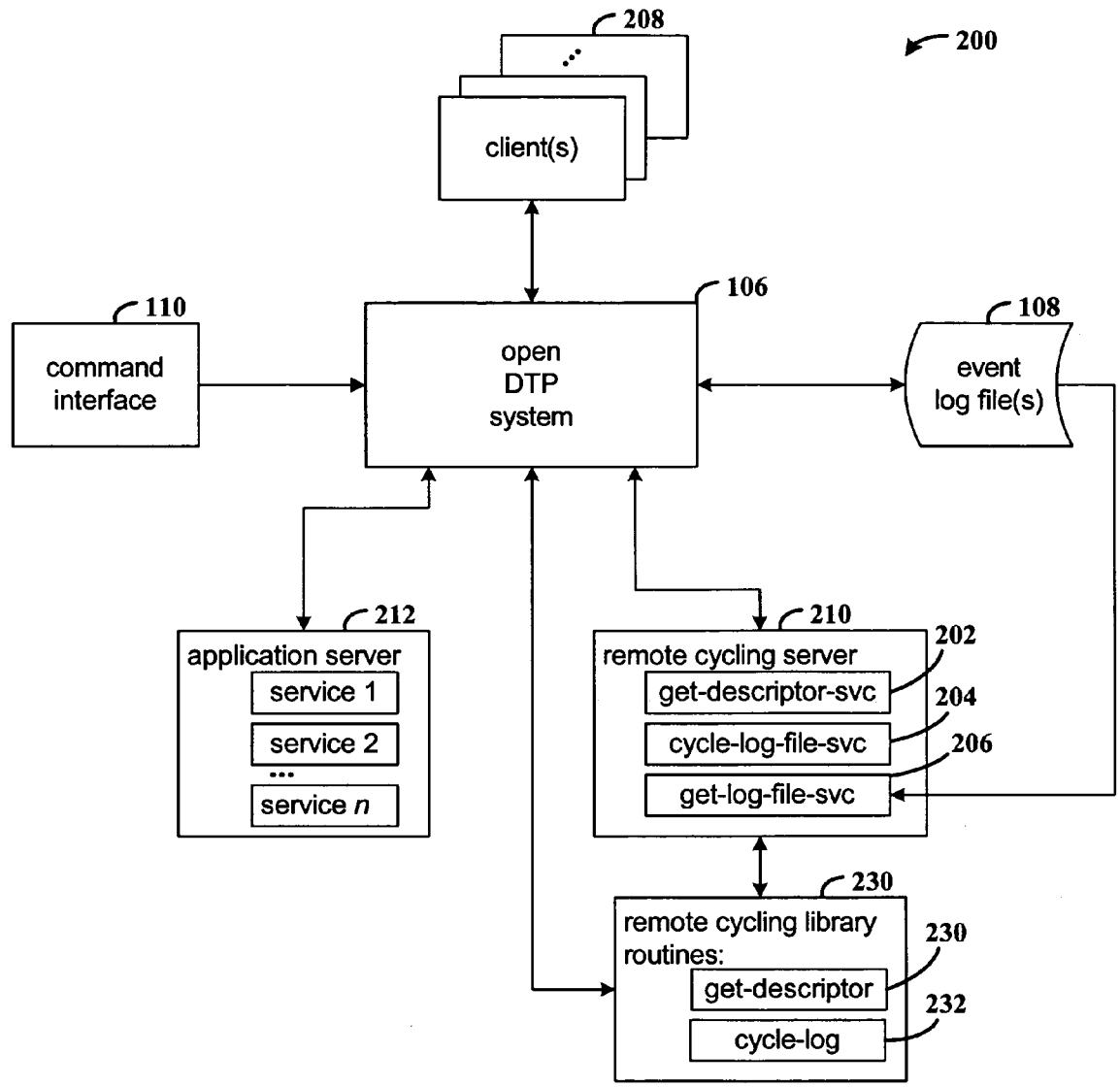
FIG. 2 is a functional block diagram of a client-server computing arrangement for processing distributed transactions and accessing an event log file via a client, in accordance with various embodiments of the invention.

FIG. 2 is a functional block diagram of a client-server computing arrangement 200 for processing distributed transactions and accessing an event log file via a client, in accordance with various embodiments of the invention. The arrangement generally provides access to the event log file(s) 108 via services 202, 204, 206 that are callable by clients 208. The remote server 210 may coexist with application server 212, with the processing of transactions submitted by server 212 resulting in logging of information to the event log file(s) 108 by the open DTP system 106. Clients 208 may be programmed for application-specific purposes, for manipulating the event log files, or a combination thereof.

The example remote services support access to the event log file and the collection of services may be referred to as the remote cycling server 210. When a file is "cycled," writing of information to the current cycle ceases, and subsequent writing is to a new cycle, as further illustrated in FIG. 3. The remote cycling services include the get-descriptor-svc service 202, the cycle-log-file-svc service 204, and the get-log-file-svc service 206. In various embodiments of the invention, the services of the remote cycling server are provided to allow a user to access the event log file(s) via a client 208. In this way, a user need not be inconvenienced with having to resort to using the command interface 110 nor with having to obtain terminal access to the open DTP system. The services 202, 204, and 206 are callable by a client in a manner similar to the way in which application services 212 are callable from a client. In one embodiment, the get-log-file-svc service routine is responsive to a conversational communication with a client, and communications with the get-descriptor-svc and cycle-log-file-svc services may be synchronous, conversational, or asynchronous, depending on implementation requirements. The collection of services allow a user to remotely access the event log file without having to resort to a local login at the system that hosts the event log file(s).

The get-descriptor-svc service 202 returns system-related information that describes the event log file, such as the name of the file. The file name may be used in subsequent service calls to access the event log file. The cycle-log-file-svc service cycles a selected event log file, and the get-log-file-svc service returns the contents of a selected event log file.

To limit access to the various entry points available in the open DTP system 106, the remote cycling services access the event log file(s) via remote cycling library routines 230. The get-descriptor library routine 230 is called by the get-descriptor-svc service 202 and calls into the open DTP system 106 to obtain the file descriptor(s) of the event log file(s). The cycle-log library routine 232 is called by the cycle-log-file-svc service 204 and cycles the specified event log file. In the example embodiment, the get-log-file-svc service 206 reads the selected event log file without going through a library routine.

Figure 3:
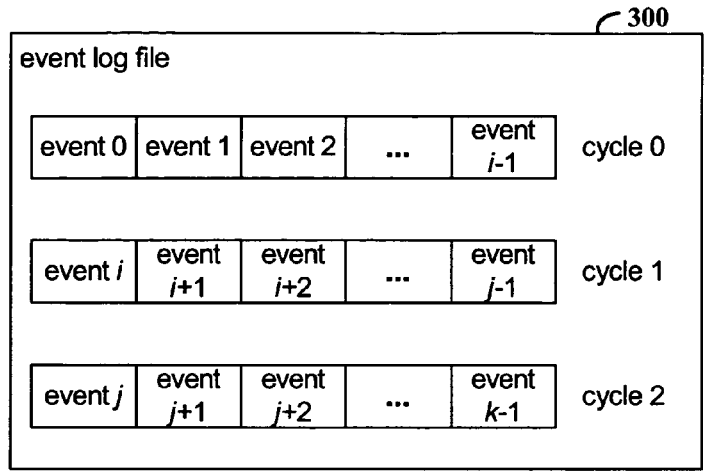
FIG. 3 is a block diagram that illustrates the relationship between cycles of an event log file.

FIG. 3 is a block diagram that illustrates the relationship between cycles of an event log file. When the event log file 202 is cycled, logging of information to the current cycle ceases, and subsequent event information is logged to a new cycle. Three example cycles, 0, 1, and 2, are illustrated in event log file 300. Information pertaining to events o through i–1 is contained in cycle 0, information pertaining to events i through j–1 is contained in cycle 1, and information pertaining to events j through k–1 is contained in cycle 2. The example of the event log file was cycled at events i–1 and j–1, with logging of event information continuing in the last cycle 2.

Figure 4:
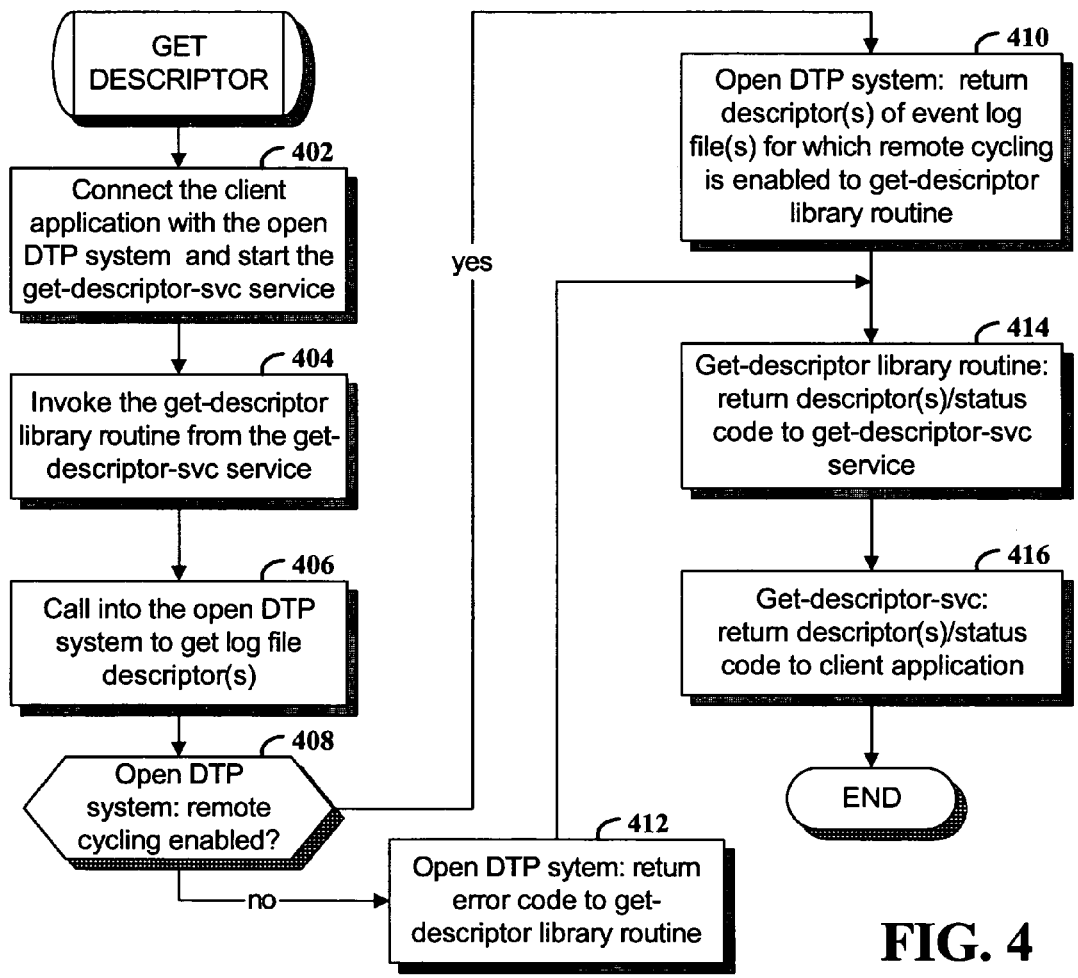
FIG. 4 is a flowchart of an example process for obtaining file descriptors for one or more event log files via a client application in accordance with various embodiments of the invention.

FIG. 4 is a flowchart of an example process for obtaining file descriptors for one or more event log files via a client application in accordance with various embodiments of the invention. The get-descriptor-svc service allows a client to obtain the file descriptor(s) of those event log file(s), including the system event log file, for which remote cycling is enabled. The service does not require input data.

To obtain the file descriptor(s), the client connects with the open DTP system, which in turn starts the get-descriptor-svc service (step 402). The get-descriptor-svc service invokes the get-descriptor library routine, which calls on functions of the open DTP system (steps 404, 406).

The open DTP system checks whether remote cycling is enabled (decision step 408). Multiple levels of control are provided for obtaining the file descriptors of event log files controlling remote cycling. A master configuration flag controls whether any file descriptor may be returned and whether any remote cycling is allowed, a system event-log flag controls whether clients are allowed to cycle the system event log file, and respective user-level flags are associated with user-defined event log files. To obtain the file descriptor of or remotely cycle any event log file, the master configuration flag must be set to allow remote cycling. In addition, to obtain the file descriptor or cycle any user-defined event log file the flag associated with that event log file must be set to allow remote cycling.

If the master configuration flag indicates that remote cycling is enabled (decision step 408), the open DTP system returns to the library routine the file descriptors of those files for which remote cycling is enabled (step 410). If the master configuration flag indicates that remote cycling is not enabled, the open DTP system returns an error status code (step 412).

The library routine returns the descriptor(s)/status code to the get-descriptor-svc service (step 414), and the get-descriptor service provides the file descriptor(s)/status code to the client (step 416) to complete the process.

Figure 5:
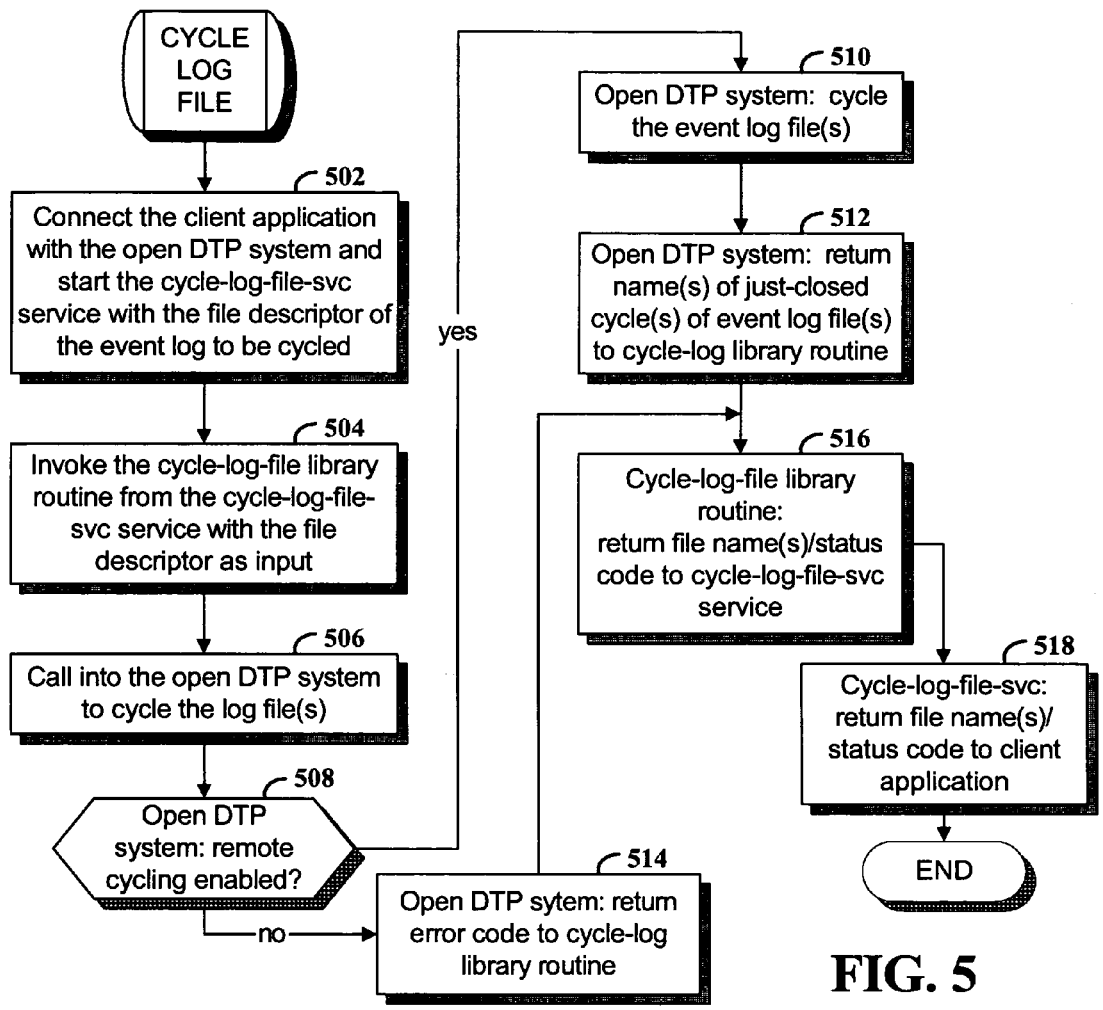
FIG. 5 is a flowchart of an example process for cycling one or more event log files via a client application in accordance with various embodiments of the invention.

FIG. 5 is a flowchart of an example process for cycling one or more event log files via a client application in accordance with various embodiments of the invention. The process illustrates the flow of control from the client through the cycle-log service to the library routine of the open DTP system and back to the client.

The cycle-log service permits cycling, via a client call, of either a user-defined event log file or the system event log file. The service takes an input file descriptor, an empty string, or the keyword ALL to determine which event log file(s) to cycle. The file name of the cycled (the cycle that was just closed) event log file(s) is returned.

The client connects with the open DTP system to start the cycle-log-svc service routine (step 502). In so doing, the client provides as input the file descriptor of the event log file to be cycled. The file descriptor indicates the name of the file. The cycle-log-svc service routine calls the cycle-log library routine and provides the file descriptor as input (step 504). By providing the functions that access the event log file(s) in service routines which call library routines that interface to the open DTP system, the user need not know the specific details for interfacing with the DTP and access to internal functions of the distributed transaction processing is limited.

The cycle-log library routine calls into the open DTP system to cycle the log file (step 506). The open DTP system checks whether remote cycling is enabled (decision step 508). If remote cycling is enabled, the open DTP system cycles the referenced file (step 510). If the keyword ALL is input, all event log files are cycled. If no input string is specified, the system event log file is cycled. Otherwise, the event log file identified by the input string is cycled. The open DTP system returns the name of the just-cycled file to the cycle-log library routine (step 512). If remote cycling is not enabled (decision step 508), the open DTP system returns an error code to the cycle-log library routine (step 514).

The cycle-log library routine returns either the file name or error status code to the cycle-log-svc service routine (step 516), and the cycle-log service routine then returns the file name or error code to the calling client (step 518).

Figure 6:
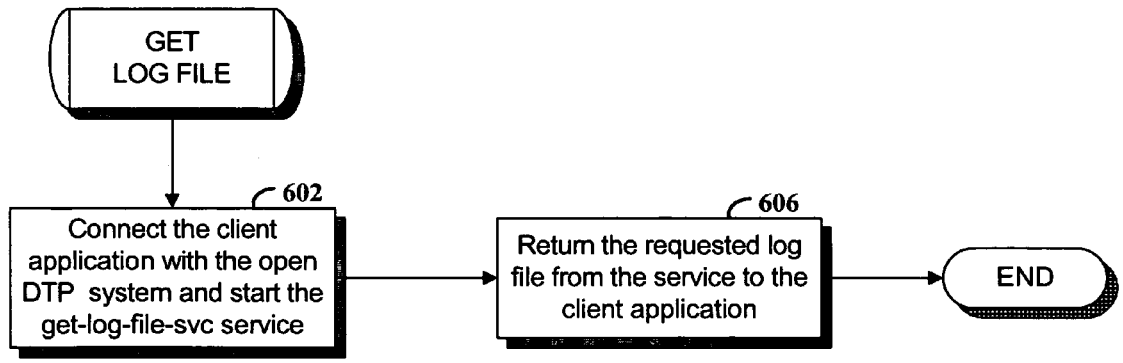
FIG. 6 is a flowchart of an example process for obtaining an event log file via client application in accordance with various embodiments of the invention. The get-log-file-svc service may be called by a client to obtain the contents of a selected event log file.

FIG. 6 is a flowchart of an example process for obtaining an event log file via client application in accordance with various embodiments of the invention. The get-log-file-svc service may be called by a client to obtain the contents of a selected event log file. The client will communicate with the get-log-file-svc service using XATMI conversational requests such as tpconnect( ), tpsend( ), or tprecv( ) (step 602). When the get-log-file-svc service is called via tpconnect( ), a conversation is started between the client and the service. The client sends the name of the requested file, including the cycle number. The service loops on calls to tpsend( ) as long as the end of the file is not reached, sending the file, for example, 20 lines at a time (step 606). Once the end of file is reached the service calls tpreturn( ) to end the conversation and send the last lines of the file.

Those skilled in the art will appreciate that various alternative computing arrangements would be suitable for hosting the processes of the different embodiments of the present invention. In addition, the processes may be provided via a variety of computer-readable media or delivery channels such as magnetic or optical disks or tapes, electronic storage devices, or as application services over a network.

In addition to the embodiments of the invention described above, other aspects and embodiments will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A processor-based method for providing access to a plurality of event log files, comprising:

writing information to respective current logical portions of the plurality of event log files by an open distributed transaction processing system in response to processing of transactions;

initiating a first service in response to a service call by a client;

instructing the open distributed transaction processing system, via the first service, to cycle a selected one of the plurality of event log files identified by a file name provided by a client to the first service;

preventing cycling of an event log file requested by file name by the first service in response to a first state of a first configuration parameter that is associated with all of the plurality of event log files, wherein the preventing includes preventing the cycling in response to a second state of the first configuration parameter and a first state of a second configuration parameter associated with the event log file with the input file name; and cycling the selected one of the plurality of event log files in response to the second state of the first configuration parameter and a second state of the second configuration parameter, wherein cycling includes stopping writing of information to the current logical portion of the file and commencing writing of information to a new logical portion of the file by the open distributed transaction processing system in cycling the event log file, whereby the new logical portion becomes the current logical portion.

2. The method of claim 1, further comprising;

initiating a second service in response to a service call by a client; and instructing the open distributed transaction processing system, via the second service to obtain and return a file name of the event log file.

3. The method of claim 1, further comprising:

initiating a second service in response to a service call by a client; and returning the contents of the event log file to the client via the second service.

4. The method of claim 1, further comprising:

initiating a second service in response to a service call by a client;

instructing the open distributed transaction processing system, via the second service to obtain and return a file name of the event log file; and denying the second service access to the file name of the event log file in response to the first state of the first configuration parameter associated with the event log file.

5. An apparatus for providing access to a plurality of event log files, comprising:

means for writing information to respective current logical portions of the plurality of event log files by an open distributed transaction processing system in response to processing of transactions;

means for initiating a first service in response to a service call by a client;

means for instructing the open distributed transaction processing system, via the first service, to cycle a selected one of the plurality of event log files identified by a file name provided by a client to the first service;

means for preventing cycling of an event log file requested by file name by the first service in response to a first state of a first configuration parameter that is associated with all of the plurality of event log files, wherein the preventing includes preventing the cycling in response to a second state of the first configuration parameter and a first state of a second configuration parameter associated with the event log file with the input file name; and means for cycling the selected one of the plurality of event log files in response to the second state of the first configuration parameter and a second state of the second configuration parameter, wherein cycling includes stopping writing of information to the current logical portion of the file and commencing writing of information to a new logical portion of the file by the open distributed transaction processing system in cycling the event log file, whereby the new logical portion becomes the current logical portion.

6. The apparatus of claim 5, further comprising;

means for initiating a second service in response to a service call by a client; and means for instructing the open distributed transaction processing system, via the second service to obtain and return a file name of the event log file.

7. The apparatus of claim 5, further comprising:

means for initiating a second service in response to a service call by a client; and means for returning the contents of the event log file to the client via the second service.

8. A client-server computing arrangement for providing access to a plurality of event log files, comprising:

an open distributed transaction processing system configured to write information to respective current logical portions of the plurality of event log files in response to processing of transactions, the system including a set of program-callable routines that provide access to the event log file;

a set of library routines configured to call the system routines;

a set of client-callable services, wherein one or more of the services call one or more of the library routines, and at least one of the services is coupled to the event log file, the set of services including a first service configured to instruct the open distributed transaction processing system via one or more routines in the library to cycle a selected on of the plurality of event log files identified by a file name provided by a client to the first service, wherein cycling includes stopping writing of information to the current logical portion of the file and commencing writing of information to a new logical portion of the file, whereby the new logical portion becomes the current logical portion; and wherein the distributed transaction processing system is configured to prevent cycling of an event log file requested by file name by the first service in response to a first state of a first configuration parameter that is associated with all of the plurality of event log files, wherein the preventing includes preventing the cycling in response to a second state of the first configuration parameter and a first state of a second configuration parameter associated with the event log file with the input file name, and the distributed transaction processing system further configured to cycle the selected one of the plurality of event log files in response to the second state of the first configuration parameter and a second state of the second configuration parameter.

9. The arrangement of claim 8, wherein the set of services includes a second service that instructs the open distributed transaction processing system via one or more routines in the library to obtain and return a file name of the event log file.

10. The arrangement of claim 8, wherein the set of services includes a second service that returns the contents of the event log file to a calling client.

11. The arrangement of claim 8, wherein the set of services includes a second service that instructs the open distributed transaction processing system via one or more routines in the library to obtain and return a file name of the event log file, and the open distributed transaction processing system is configured to deny the second service access to the file name of the event log file in response to the first state of the first configuration parameter associated with the event log file.

* * * * *